United States Patent [19]

Baumgartner et al.

[11] 4,130,955
[45] Dec. 26, 1978

[54] PRESSING OR SMOOTHING IRON COMPRISING A SAFETY TURN-OFF MEANS LOCATED IN A HEATING CURRENT CIRCUIT

[76] Inventors: Erich R. Baumgartner, Tiroler Platz 4; Peter Doehler, Kaulbachstrasse 59, both of Munich, Fed. Rep. of Germany

[21] Appl. No.: 807,272

[22] Filed: Jun. 16, 1977

[30] Foreign Application Priority Data

Jun. 16, 1976 [DE] Fed. Rep. of Germany ....... 2627158

[51] Int. Cl.² ..................... D06F 75/02; D06F 75/26; H05B 1/02
[52] U.S. Cl. ..................................... 38/82; 219/257; 219/502
[58] Field of Search ................... 38/82; 219/240, 241, 219/256, 257, 502

[56] References Cited

U.S. PATENT DOCUMENTS

| | | | |
|---|---|---|---|
| 2,143,701 | 1/1939 | Kelly et al. | 219/257 X |
| 2,382,587 | 8/1945 | Thomas | 219/257 |
| 2,385,606 | 9/1945 | Campbell | 38/82 X |
| 2,470,532 | 5/1949 | Thomas | 219/257 |
| 2,939,939 | 6/1960 | Derden et al. | 38/82 |

FOREIGN PATENT DOCUMENTS 44,693 11/1918 Sweden ................... 219/257

Primary Examiner—Patrick D. Lawson
Attorney, Agent, or Firm—Griffin, Branigan and Butler

[57] ABSTRACT

A pressing iron contains a safety turn-off switch to prevent scorching if the iron is held stationary for too long.

An acceleration sensor produces a signal in response to a predetermined acceleration of the iron and an actuating circuit turns off the iron if the iron is not sufficiently accelerated.

14 Claims, 7 Drawing Figures

PRESSING OR SMOOTHING IRON COMPRISING A SAFETY TURN-OFF MEANS LOCATED IN A HEATING CURRENT CIRCUIT

BACKGROUND

This invention relates to a pressing or smoothing iron comprising safety turn-off means located in the heating current circuit.

There are known pressing irons (or smoothing or flat irons) which, as a protection against overheating, comprise a temperature-sensitive switch which is located in the heating current circuit and which disconnects the heating conductors from the current supply as soon as a permissible temperature is exceeded.

The known safety turn-off means do not ensure that the clothing pieces or textile fabrics are not burned, scorched or discoloured when the pressing iron is unintentionally left lying on the goods being ironed. Also, known safety turn-off means might not be responsive to inadmissible temperatures until after the goods being ironed have already been damaged or ruined.

An object of this invention is to solve the problem of constructing a pressing iron comprising safety turn-off means located in the heating current circuit so as to reliably protect the goods being ironed against burning, scorching or discolouring when the pressing iron is inadvertently left lying on the goods being ironed and forgotten.

SUMMARY

According to preferred embodiments of the invention, a safety turn-off means includes an acceleration sensor comprising a ball located in a curved channel and adapted to assume a lowermost position therein. Upon acceleration, the ball oscillates about the lowermost position. The position is scanned in a contactless manner by a scanning device to produce a turn-off or disconnecting signal for energizing the safety turn-off means if the iron is stopped long enough to cause scorching.

According to one preferred embodiment, the scanning device has a source of radiation, in particular a radiation-emitting diode, arranged at one side of the tube or channel which has transparent walls; and, a detector is responsive to the radiation and located at the opposite side of said tube or channel.

It will be apparent that the acceleration sensor proposed here has an extremely rugged structure and is very reliable in service and can be cheaply manufactured. Moreover there is an essential advantage that the acceleration characteristic is selectable at will by a corresponding curvature or pitch or rise of the tube or channel. Furthermore, by the orientation of the tube or channel of said acceleration sensor there is a predetermined or preselected acceleration direction so that the acceleration sensor will be preferably responsive to that direction of acceleration or to an essential acceleration component having that direction.

In the pressing iron proposed here, the safety turn-off means comprising the acceleration sensor is effective in a manner such that the heating conductors of the pressing iron remain connected to the current supply so long as the acceleration sensor is signalling or indicating acceleration occurrences or operations determined by the normal use of the pressing iron. In other words, the acceleration sensor is operative to control or maintain the iron's current supply. Yet as soon as the pressing iron is left lying on the goods being ironed and forgotten there, a standstill-signalling signal is derived from the acceleration sensor and causes the disconnection of the current supply to the heating leads or conductors of the pressing iron. Time switch members ensuring a stable operation are also provided.

Suitable further developments are subject matter of the following description and claims, the above reference having been made for the sake of simplification and reduction of the description. However, it is also to be noted that the acceleration sensor proposed here is of independent inventive value so that the use thereof is not limited to the incorporation into pressing irons.

BRIEF DESCRIPTION OF THE DRAWINGS

A number of exemplary embodiments will now be described in greater detail hereinafter with reference to the drawing in which.

DETAILED DESCRIPTION

Figure 1:
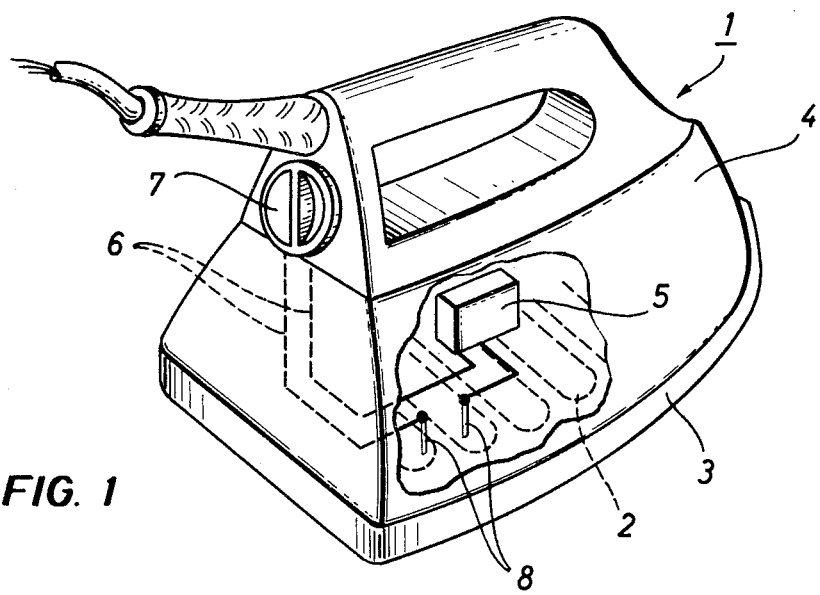
FIG. 1 is a perspective schematic view of a pressing iron comprising an acceleration-sensitive safety circuit breaker disposed in the heating current circuit.

The pressing iron 1 shown schematically in FIG. 1 has a pressing iron sole 3 which contains heating conductors 2 and which is connected to a housing 4 (e.g., by known means). The housing 4 is shown as broken away in FIG. 1 so that within the interior there is visible a safety turn-off means 5 located in one of the leads or supply lines 6 between a switch and temperature selector 7 at the handle portion of the housing and connection contacts 8 of the heating conductors 2.

In the position of rest or stationary position of the pressing iron 1, the safety turn-off means 5 is effective so that, even when the switch and temperature selector 7 is ON and optionally set to the peak desired temperature, the current supply to the heating conductors 2 remains cut out. For the initial heating of the pressing iron it is placed on edge in an inclined or upright position so that the acceleration sensor is placed into an "ON" or responsive condition even though there is no continuous acceleration. In this manner the pressing iron sole 3 is initially heated up to the desired temperature. Thereupon, the ON state is maintained only when the pressing iron in use is kept moving. When there is no movement beyond a predetermined time period then the safety turn-off means 5 is rendered operative and disconnects the power supply to the heating conductors 2.

Figure 2:
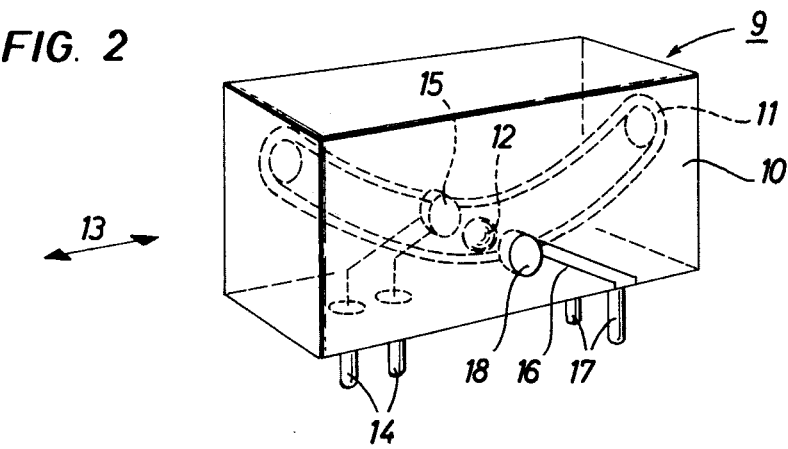
FIG. 2 is a schematic view of an acceleration sensor formed in a transparent block of plastic material.

The acceleration sensor 9 shown in FIG. 2 contains a transparent block 10 of synthetic material or plastic wherein a downwardly arcuate tubular channel 11 is formed. The plastic block 10 may be a multi-part casting which is correspondingly subdivided to form the channel 11 therein.

The tubular or tube-like channel 11 is closed at its obliquely upwardly directed ends and includes a non-transparent or opaque movable member in the form of a ball 12. When the block 10 is subjected to acceleration in the direction of arrow 13 depicted in FIG. 2 then the ball 12, by virtue of its inertia, moves up in one or the other of the obliquely upwardly directed legs of the tube-like channel 11 and departs from the lowest stable position of rest shown in FIG. 2.

A light emitting diode 15 and a photocell 18 are located adjacent the lowermost point of the tube-like channel 11 and are connected to contact pins 14 and 17, respectively, as shown—the diode functioning as a light source and the photocell functioning as a light detector. The light emitting diode 15 and the photocell 18 are located in depressions or recesses in the transparent block 10 of synthetic material. The path of light rays between the diode 15 and the photocell 18 is interrupted by the ball 12 whenever the ball is in its position of rest in the lowermost point of the tube-like channel 11. As soon as acceleration forces act upon the block 10 due to motion of the iron, the ball 12 departs from the position of rest according to FIG. 2 and clears the way for light to radiate from the diode 15 to the photocell 18 so that an output voltage appears at contact pins 17, notwithstanding temporary interruptions because of each respective passage of ball 12.

Figure 3:
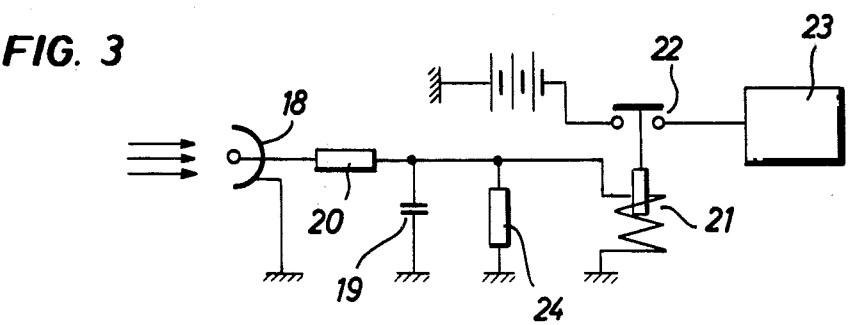
FIG. 3 is a schematic circuit diagram of a safety turn-off means.

From FIG. 3 it can be seen that the output voltage from pins 17 can be used for charging a capacitor 19 via a small resistor 20. The voltage of the charged capacitor 19 suffices to energize a relay 21, the switching contacts 22 of which are located in the excitation current circuit of a main switching relay 23 which controls the current supply to the heating conductors 2 of the pressing iron.

If the charging or recharging of capacitor 19 by photocell 18 does not take place often enough, capacitor 19 is discharged after a predetermined time via resistor 24 so that that relay 21 becomes deenergized and main switching relay 23 cuts off the current supply to heating conductors 2.

It is to be understood that electronic switches may be used in lieu of the relays mentioned in the present description and shown in the drawings. The illustrated circuits merely serve to describe the basic idea and can be modified and further developed in many respects.

Electronic switch means, however, provide a very important advantage to the acceleration sensor of the invention. That is, they are contactless so that scanning of the position of ball 12 leads to signals which change their state very quickly thereby enhancing the foolproof aspects of the device—particularly where the output signals are digitally evaluated.

Similarly, where the channel 11 is of non-magnetizable material and the ball is magnetic, its motion and/or acceleration can be detected by a magnetic circuit in lieu of the diode-photocell embodiment described above.

Figure 4:
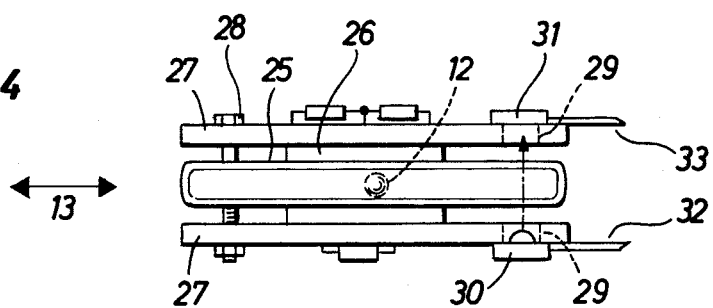
FIG. 4 is a plan view of an alternate embodiment of the acceleration sensor of FIG. 2.

The acceleration sensor according to FIG. 4 has a channel formed by a bent tube 25 for receiving the ball 12. The bent tube 25 also consists of a transparent material and is closed at the two ends thereof. The configuration of the tube corresponds to the shape of the downwardly bent channel 11 according to FIG. 2.

The bent tube 25 is firmly clamped between circuit support plates 27 by means of screws 28, with blocks 26 adapted to the shape of the tube being interposed therebetween, as shown in FIG. 4. The circuit support plates 27 support the switching circuits of the safety turn-off means and are provided with openings 29 disposed opposite each other within the range of one of the ends of the bent tube 25. A light emitting diode 30 is fastened in one of the openings 29 and a phototransistor or photocell 31 is fastened in the other. In this manner, whenever accelerations occur which act upon the acceleration sensor according to FIG. 4 in the direction of arrow 13, the ball 12 oscillates in the bent tube 25 and temporarily interrupts the radiant path between the light emitting diode 30 and the phototransistor 31. Contact lugs 32 and 33, respectively, of the circuit support plates 27 serve for supplying electrical power to diode 30 and for deriving the detector signals from phototransistor 31.

Figure 5:
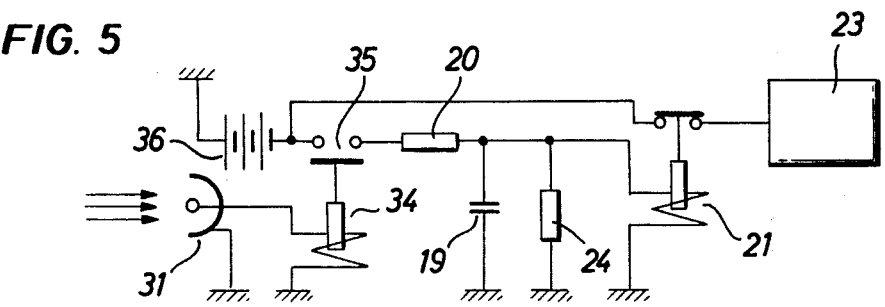
FIG. 5 is a schematic circuit diagram of a safety turn-off means excited by a turn-off signal of the acceleration sensor corresponding to maximum acceleration.

By using the acceleration sensor 4, a safety turn-off means for the pressing iron according to FIG. 5 can be constructed in a manner such that the phototransistor 31 is coupled to a relay or electronic switch 34. At this time, closed-circuit contacts 35 of the switch 34 cause the capacitor 19 to receive short-time charge-voltage surges from a voltage source 36 when the ball 12 temporarily breaks the path of rays between the diode 30 and the phototransistor 31. Hence, the relay 34 is deenergized for a short time while the closed-circuit contacts 35 are closed for a short time. Yet when these charge voltage surges are absent for a longer time, then the capacitor 19 is discharged via the resistor 24 so that the relay 21 is deenergized and the operations described briefly hereinbefore in conjunction with FIG. 3 take place.

The acceleration sensor according to FIG. 2 as well as the acceleration sensor according to FIG. 4 can include further devices for the contactless scanning of other positions of ball 12 to thereby be able to control additional functions of the electrical circuit associated with the heating conductors 2 of the pressing iron. For example, a further arrangement of mutually opposite radiation sources and radiation detectors can be utilized to maintain the pressing iron in its switched-on condition when the iron is on edge to be heated.

Figure 6:
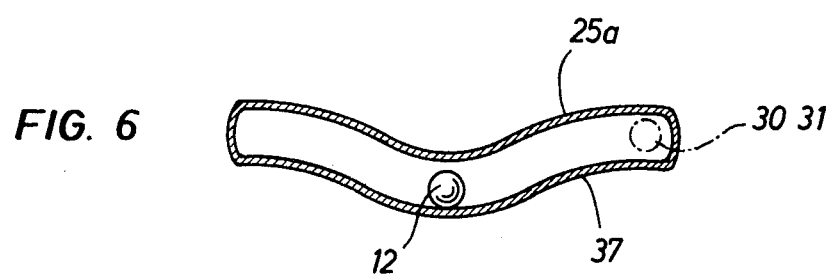
FIG. 6 is a schematic sectional view of a portion of the acceleration sensor; and, FIG. 7 is a sectional view through a block comprising the channels of the acceleration sensor in the shape of bores.

FIG. 6 shows another embodiment of a tube 25a which contains ball 12. From the lowest point, the ball 12 must initially overcome a threshold point 37 when acceleration forces appear, to thereby get into the range within which the radiation source 30 and detector 31 perform scanning. In this manner, a predetermined switching characteristic is realized. For dampening, the channel or the tube in which the ball 12 is disposed can be provided with a predetermined gas or liquid filling. Furthermore, it is possible to adjust the response characteristics of the acceleration sensor by a corresponding dimensioning of the diameter of ball 12 relative to the internal diameter of the tube-like channel.

Figure 7:
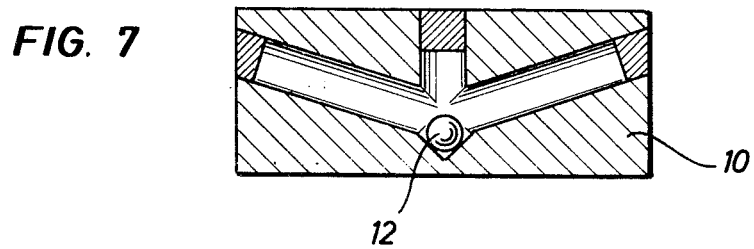

Finally, FIG. 7 shows a further embodiment of the block 10 of synthetic material which, in a manner readily apparent from FIG. 7, contains the channels for ball 12 in the shape of bores which meet with each other and which are closed at their respective ends.

I claim:

1. A pressing iron containing a safety turn-off means located in a heating-current circuit thereof and comprising:
 an acceleration sensor for producing a signal in response to a predetermined acceleration of said pressing iron, said acceleration sensor including a movable means located in a channel, for freely moving to a lowermost portion of said channel under the influence of gravity, a channel forming means for forming said channel to have a lowermost portion thereof when said pressing iron is in a pressing attitude, but being shaped so that, upon acceleration of said pressing iron said movable means is moved out of said lowermost portion;

a detecting means for detecting predetermined motion of said movable means out of said lowermost portion and producing a signal in response thereto; and, an actuating means operative in response to a predetermined level of said signal for actuating said safety turn-off means.

2. The iron of claim 1 wherein said movable means is a ball.

3. The iron of claim 1 wherein said channel forming means has transparent walls and said detecting means includes:

a radiation-emitting diode arranged at one side of said channel; and, a detector responsive to said radiation and located at the opposite side of said channel.

4. The iron of claim 1 wherein said channel is of non-magnetizable material and said movable means is magnetic; and, said detecting means includes a magnetic circuit for detecting predetermined motion of said movable magnetic means.

5. The iron of claim 1 wherein said channel ascends from said lowermost portion for a predetermined distance at a first rate and then, at a threshold point, ascends at a second rate.

6. The iron of claim 5 wherein said second rate of ascension is less than said first.

7. The iron of claim 1 wherein said sensor includes a damping means.

8. The iron of claim 7 wherein said damping means comprises a fluid.

9. The iron of claim 8 wherein said damping means further comprises a decreasing dimension of said channel relative to the corresponding dimension of said movable means.

10. The iron of claim 1 wherein said detecting means is for detecting a predetermined maximum motion of said movable means.

11. The iron of claim 1 wherein said acceleration sensor is clamped in said iron between two vertical plates which are also operative as a mounting means for said safety turn-off means.

12. The iron of claim 11 wherein said support plates include openings therein and including:

a radiation-emitting diode arranged in one of said openings;

a radiation detector in another of said openings located opposite said one opening and operative in response to said predetermined level of said signal to actuate said safety turn-off means.

13. The iron of claim 12 wherein said predetermined level of said signal is a function of said motion of said movable means.

14. The iron of claim 13 wherein said movable means is a ball.

* * * * *